United States Patent [19]

Mulder

[11] 3,946,481

[45] Mar. 30, 1976

[54] TAPER LOCK BOLT REMOVER

[76] Inventor: Roland J. Mulder, 1120 Morse Ave., Sacramento, Calif. 95825

[22] Filed: Mar. 28, 1975

[21] Appl. No.: 563,250

[52] U.S. Cl. .................................... 29/252; 29/267
[51] Int. Cl.[2] .......................................... B23P 19/04
[58] Field of Search .......... 29/252, 267, 200 D, 220

[56] References Cited

UNITED STATES PATENTS

| | | | |
|---|---|---|---|
| 2,256,061 | 9/1941 | Tapken | 29/267 X |
| 2,618,183 | 11/1952 | Cooke | 29/267 X |
| 3,121,941 | 2/1964 | Bellarts | 29/252 |
| 3,820,220 | 6/1974 | West | 29/267 X |

*Primary Examiner*—Al Lawrence Smith
*Assistant Examiner*—Nicholas P. Godici
*Attorney, Agent, or Firm*—Joseph E. Rusz; Richard J. Killoren

[57] ABSTRACT

An apparatus for removing taper lock bolts from aircraft wings having a lever arm and a bolt which acts as a fulcrum for the lever. The fulcrum bolt is attached to the aircraft wing by means of a taper lock bolt which is adjacent to the taper lock bolt to be removed. The lever arm is operated by a pull rod which passes through a hole in the wing. A commercially available porta power tool provides an upward force on the pull rod to turn the lever arm around the fulcrum bolt to apply a downward force on the taper lock bolt to be removed.

4 Claims, 5 Drawing Figures

TAPER LOCK BOLT REMOVER

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for removing taper lock bolts from aircraft wings. These bolts are difficult to remove due to the confined working space. In the past, a hammer and rod have been used for driving these bolts out of the wing structure. This has been very time consuming and is not entirely satisfactory since it often results in some damage.

BRIEF SUMMARY OF THE INVENTION

According to this invention, these taper lock bolts are removed with a specially constructed remover tool. The tool has a bolt, which provides a fulcrum for a lever arm. The bolt is secured to the wing structure adjacent the taper lock bolt to be removed. A commercially available portable power tool is used to supply power to the pull rod which is attached to one end of the lever arm. When a pull force is applied through the pull rod to the lever arm, the hammer end of the lever arm presses downward against the taper lock bolt to remove it from the wing structure.

IN THE DRAWING

Figure 1:
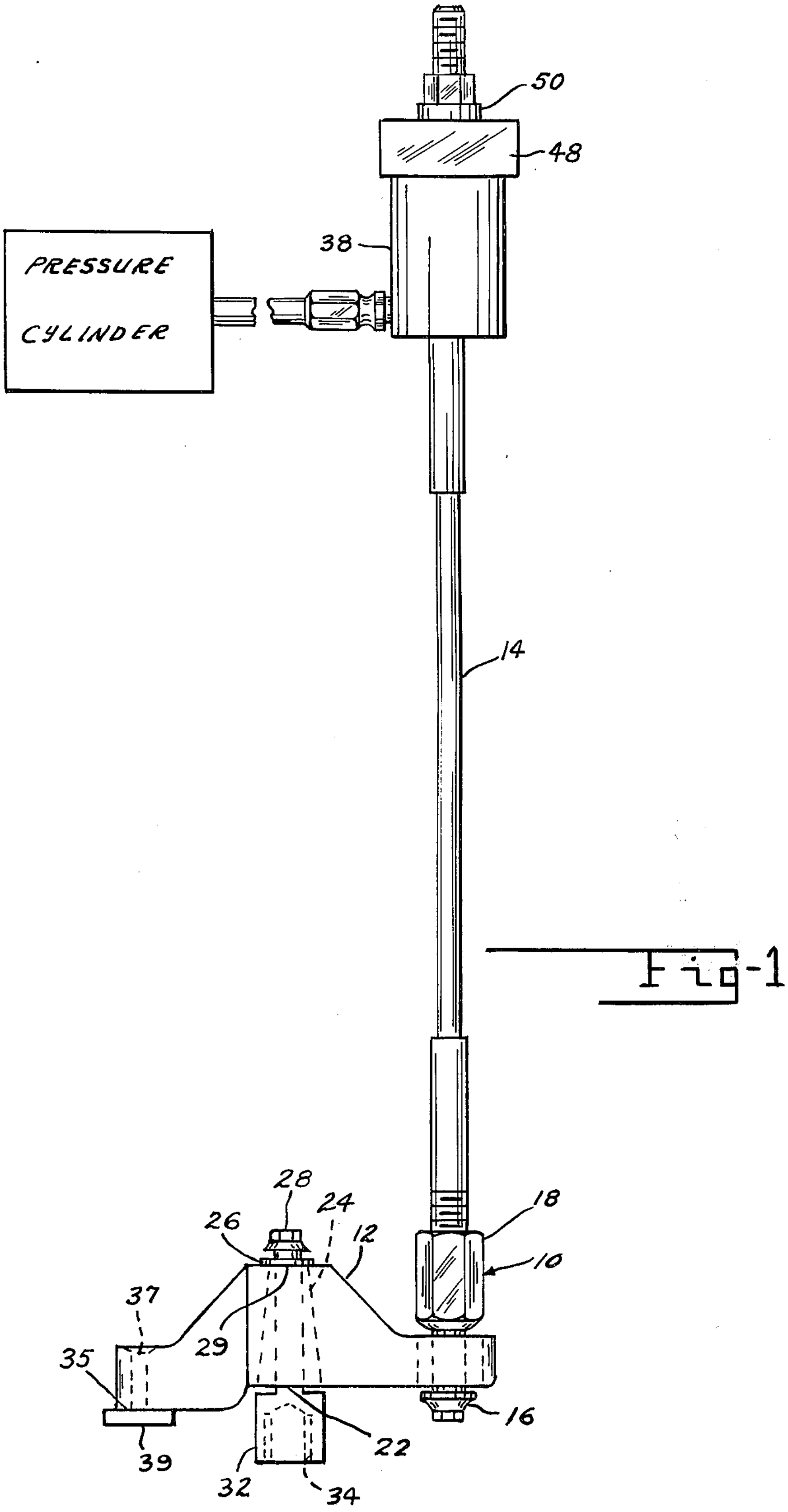
FIG. 1 is a partially schematic front elevation of a taper lock bolt remover according to the invention.
Figure 2:
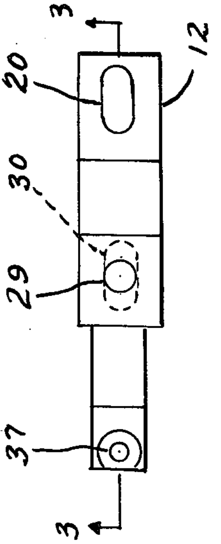
FIG. 2 is a top view of the lever arm member for the device of FIG. 1.
Figure 3:
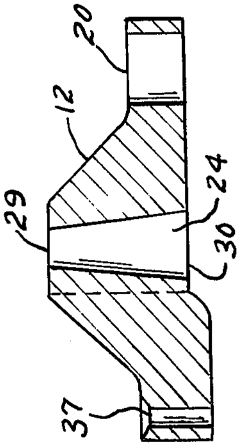
FIG. 3 is a sectional view of the device of FIG. 2 along the line 3—3.

Reference is now made to FIGS. 1–3 of the drawing which shows a taper lock bolt remover 10 having a lever arm 12, a pull rod 14 secured to one side of the lever arm 12 with a bolt 16 and coupling element 18. The bolt 16 is positioned in an elongated slot 20 in the lever arm 12. A second bolt 22 is positioned in a slot 24. The sides of the slot 24 are tapered to provide a round opening 29 adjacent the washer 26 and nut 28 and an elongated opening 30 adjacent a fastener 32 on bolt 22. The fastener 32 has internal threads, shown schematically at 34, for securing the taper lock bolt remover to a taper lock bolt which is adjacent to the bolt that is to be removed. The hammer end 35 of the lever 12 has a bore hole 37 for receiving a shaft secured to a pad 39. The pad 39 is not needed in all operations of the taper lock bolt remover. Other type pads or attachments than that shown may be used with the device of the invention.

Figure 4:
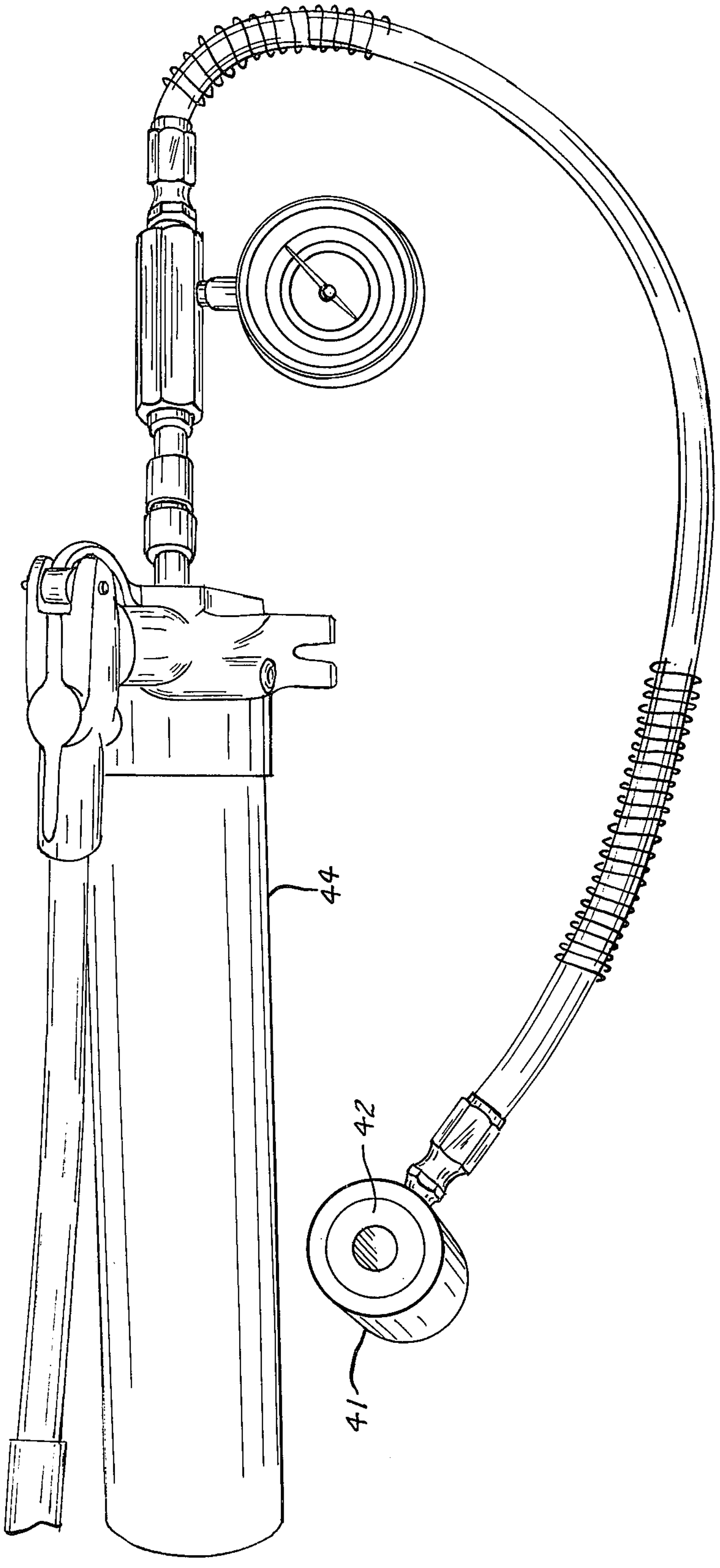
FIG. 4 is a perspective view of a conventional portable power tool used with the device of the invention.

An upward force is applied to the rod 14 by means of a portable power tool 38, having a hydraulically operated ram cylinder, such as are available from Snap-On Tool Corp. These portable power tools, as shown in FIG. 4, have a ram housing 41 with a ram cylinder 42. The cylinder 42 is operated by hydraulic pressure supplied from a pump 44. The ram cylinder is returned by a spring within the housing 41 when the hydraulic pressure is released. The force of the portable power tool is supplied to rod 14 by means of plate 48 and nut 50.

Figure 5:
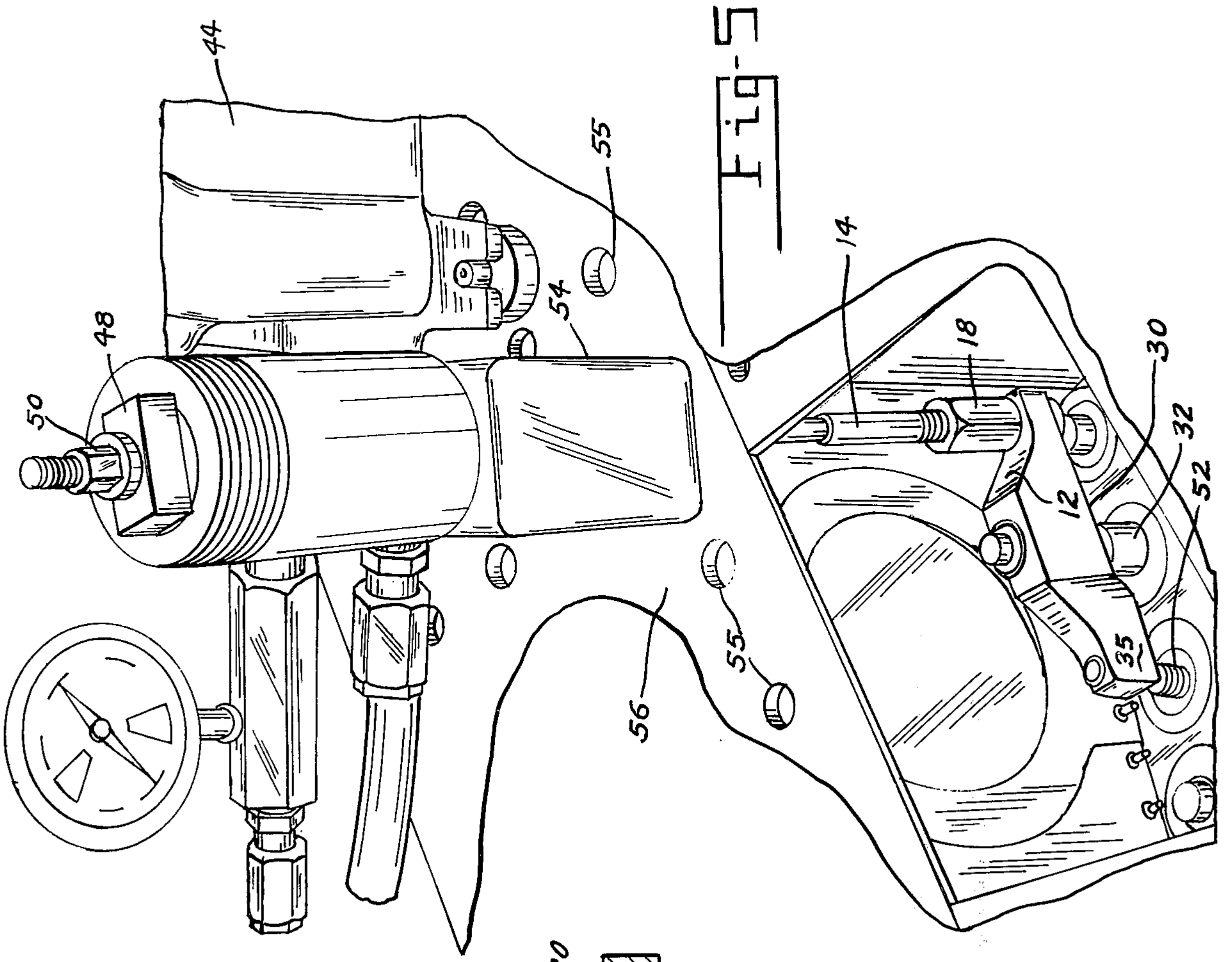
FIG. 5 is a perspective view of a portion of an aircraft wing structure showing the device of the invention in use.

In the operation of the device of the invention, as shown in FIG. 5, the fastener 32 is secured to a taper lock bolt, which cannot be seen in the drawing, adjacent the taper lock bolt 52 which is to be removed. The hammer end 35 of the lever arm 12 rests against the taper lock bolt 52. The pull rod 14, having a plate 48 and a nut 50 thereon, is inserted through the cylinder 42, shown in FIG. 4, in the ram housing 41. The rod 14 is then passed through a spacer block 54 and then through one of the holes 55 in the wing structure 56. The end of the rod 14 is then secured to the coupling member 18. Operation of the pump 44 causes the ram housing 41 to bear down against block 54 and wing structure 56. This also causes the cylinder 42 to react against plate 48 and nut 50 to raise the rod 14, thus applying an upward force on the lever arm 12. This then applies a downward force against the taper lock bolt 52 to remove the bolt from the wing structure.

While the device has been shown for use in removing taper lock bolts in wing structure, it can also be used in other apparatus wherein it is desirable to provide a pushing force in close spaces.

There is thus provided an apparatus for use in close spaces for removing taper lock bolts from wing structures.

I claim:

1. An apparatus for removing taper lock bolts from an aircraft wing, comprising: a lever arm; said lever arm including means at one end for applying a pushing force to said taper lock bolt; means for securing said lever arm to the aircraft wing at a position adjacent to said taper lock bolt; said means for securing said lever arm to said aircraft wing including means for providing a fulcrum for said lever arm; means for applying a pulling force to said lever arm on the side of said fulcrum remote from said means for applying a pushing force on said taper lock bolt; said means for applying a pulling force to said lever including a pull rod secured to said lever and means for applying a pulling force to said pull rod; said means for applying a pulling force to said pull rod including a hydraulic ram having a housing and a hydraulically movable cylinder positioned within said housing and around the pull rod; a hydraulic pump connected to said hydraulic ram for supplying fluid under pressure to said hydraulic ram to move the cylinder with respect to the ram housing; means for applying the force from said ram housing to said aircraft wing structure and means for applying the force of said cylinder to said pull rod.

2. An apparatus for removing taper lock bolts from an aircraft wing, comprising: a lever arm; said lever arm including means at one end for applying a pushing force to said taper lock bolt; means for securing said lever arm to the aircraft wing at a position adjacent to said taper lock bolt; said means for securing said lever arm to said aircraft wing including means for providing a fulcrum for said lever arm; means for applying a pulling force to said lever arm on the side of said fulcrum remote from said means for applying a pushing force on said taper lock bolt; said means for securing said lever arm to the aircraft wing including a bolt having an internally threaded member adapted to be secured to a taper lock nut on said aircraft; said bolt having a portion thereof passing through a hole in the lever arm, with the hole being circular on the side remote from said internally threaded member and elongated in the direction along a line between the push force applying means and the pulling force applying means, on the side adjacent the internally threaded member.

3. The device as recited in claim 2 wherein said means for applying a pulling force to said lever includes a pull rod secured to said lever and means for applying a pulling force to said pull rod.

4. The device as recited in claim 3 wherein said means for applying a pulling force to said pull rod includes a hydraulic ram having a housing and a hydraulically movable cylinder positioned within said housing and around the pull rod; a hydraulic pump connected to said hydraulic ram for supplying fluid under pressure to said hydraulic ram to move the cylinder with respect to the ram housing; means for applying the force from said ram housing to said aircraft wing structure and means for applying the force of said cylinder to said pull rod.

* * * * *